United States Patent [19]
El-Ibiary

[11] Patent Number: 5,509,310
[45] Date of Patent: Apr. 23, 1996

[54] BEARING ASSEMBLIES INCLUDING PROXIMITY PROBES

[75] Inventor: Yehia El-Ibiary, Greenville, S.C.

[73] Assignee: Reliance Electric Industrial Company, Greenville, S.C.

[21] Appl. No.: 214,979

[22] Filed: Mar. 18, 1994

[51] Int. Cl.$^6$ ..................................................... G01H 1/00
[52] U.S. Cl. ........................... 73/660; 340/682; 340/683; 384/448
[58] Field of Search ........................... 73/660, 593, 650, 73/661, 659; 340/680, 682, 683; 324/207.13, 207.15; 384/448, 623

[56] References Cited

U.S. PATENT DOCUMENTS

| | | | |
|---|---|---|---|
| 2,961,875 | 11/1960 | Reumund | 340/682 |
| 4,335,600 | 6/1982 | Wu et al. | 73/660 |
| 4,406,169 | 9/1983 | Ikeuchi et al. | 340/682 |
| 4,778,286 | 10/1988 | Kadokawa | 340/682 |
| 4,924,180 | 5/1990 | Nasr et al. | 73/660 |
| 4,972,110 | 11/1990 | Gorodissky et al. | 73/660 |
| 5,144,840 | 9/1992 | Whipple, III | 73/660 |

FOREIGN PATENT DOCUMENTS

| 126721 | 10/1981 | Japan | 73/660 |
|---|---|---|---|
| 1580064 | 7/1990 | Russian Federation | 384/448 |

OTHER PUBLICATIONS

Clapis et al.—"Early Diagnosis of dynamic imbalances and of misalignments in large turbogenerators", 1976, pp. 271–277.

Eubanks—"Diagnosing Rotating Equipment Ills", Feb. 1980.

Primary Examiner—Hezron E. Williams
Assistant Examiner—Nashmiya Ashraf
Attorney, Agent, or Firm—Dority & Manning

[57] ABSTRACT

Bearing assembly including at least one proximity probe for monitoring the relative vibration of a rotating shaft contained therein. The bearing assembly includes a bearing housing surrounding and supporting a cylindrical shell. The cylindrical shell defines a shaft bore for receiving a rotating shaft. At least one proximity probe is embedded in the cylindrical shell for monitoring the shaft vibration. A second proximity probe may be added to enable monitoring radial shaft position. The proximity probes are connected to an instrument or instruments for displaying a signal received from the probes for allowing a user to determine shaft vibration or position.

26 Claims, 2 Drawing Sheets

BEARING ASSEMBLIES INCLUDING PROXIMITY PROBES

BACKGROUND OF THE INVENTION

The present invention relates generally to bearing housings and, more particularly, to bearing housings including proximity probes for sensing the relative vibration and position of a rotating shaft contained therein.

As referred to herein, a bearing assembly is used to describe a device that supports a rotating, sliding, or oscillating member and that reduces friction therebetween. In one exemplary type of bearing assembly, known as a journal or sleeve bearing assembly, a cylindrical shaft or journal is supported in a stationary device known as the bearing. In a journal bearing, an oil film may be interposed between a shaft and a cylindrical shell. The shell is often referred to as a bushing, sleeve, or brass.

As referred to herein, a journal bearing can be hydrodynamic or hydrostatic. In hydrodynamic bearings, when a shaft is rotated within the bearing assembly, a flow of oil between the shaft and the shell generates pressure sufficiently high to support the load of the shaft. Hydrostatic bearings operate similarly except that externally supplied pressure is applied to the oil film in order to support the load. Hydrostatic bearings are typically used when loads are too high or speeds are too low for the self-generated interior oil film pressure to support the shaft load.

Ideally, in journal bearings, the friction between the shaft and the cylindrical shell, which is related to the viscosity of the lubricant, is small because metal to metal contact does not exist. Also, in ideal conditions, the rotating shaft is held steady within the bearing assembly. Costly failures can occur when the shaft becomes unbalanced, misaligned, or damaged.

In the past, certain types of stand alone proximity probes have been utilized to monitor shaft vibration and location for preventing costly failures and for indicating abnormalities in the proper operation of the bearing assembly. In prior applications, the proximity probes were installed by drilling and threading a hole through the bearing housing. In order to position and protect the probes, a rigid, metal housing assembly was placed in the drilled hole which surrounded the proximity probes and any wires connected thereto. The housing assembly included a top housing portion which was threaded into the bearing housing. A metal sleeve then extended from the bearing housing to a rotatable shaft contained therein.

The prior art method of installing proximity probes in journal bearings has several disadvantages. First, the cost of the probe housing assembly together with the cost of installation can comprise a very expensive package. Also, it is difficult to adjust the proximity probe in relation to the rotating shaft. During operation, the probe should remain adjacent and close to the shaft without ever contacting or touching it. In the prior art device, this gap between the probe and the shaft is difficult to adjust because the probe housing assembly is mounted to and adjusted from the outside bearing housing instead of an inside cylindrical shell. Further, because the probe housing assembly is mounted to the outside bearing housing, the probe measures shaft vibration relative to the bearing housing and not relative to the cylindrical shell which may create errors in the measurement.

SUMMARY OF THE INVENTION

The present invention recognizes and addresses the foregoing disadvantages, and others of prior art bearing assemblies.

Accordingly, it is an object of the present invention to provide an improved bearing assembly with at least one proximity probe for monitoring relative shaft vibration.

It is another object of the present invention to provide an economical system for monitoring relative shaft vibration and shaft position in a bearing housing.

It is another object of the present invention to provide an improved system for preventing bearing failure.

It is another object of the present invention to provide an improved bearing assembly that includes at least one embedded proximity probe.

A further object of the present invention is to provide an improved bearing assembly.

Still a further object of the present invention is to provide an improved method of sensing relative shaft vibration in a bearing assembly.

These and other objects are achieved by providing an improved bearing assembly. The bearing assembly includes a bearing housing adapted to rotatably support a shaft. A cylindrical shell is contained within the bearing housing and defines a shaft bore for receiving a rotatable shaft therethrough. During operation, a lubricant can be interposed between the shaft and the cylindrical shell for reducing friction within the bearing assembly.

The bearing assembly further includes at least one proximity probe having a probe sensing end. The proximity probe is embedded in the cylindrical shell. The sensing end is adapted to be placed adjacent and substantially tangent to the shaft bore where sensing is desired for sensing the relative vibration and position of a rotating shaft without contact therewith.

In one embodiment, two proximity probes are embedded in the cylindrical shell. The corresponding probe sensing ends of the proximity probes can be positioned about 90° apart from each other along the perimeter of the shaft bore for sensing not only relative vibration but also the radial position of a rotating shaft.

Within the cylindrical shell of the bearing assembly, the proximity probes can be placed in respective probe receiving channels that extend through the shell to the shaft bore. The proximity probes can be secured in the probe receiving channels by an adhesive or can be threaded into the channels. The channels can include a widened portion where the channels intersect with the shaft bore. A non-conduction material can be placed within the widened portion, surrounding the probe sensing end, for providing a smooth surface lining the shaft bore.

An instrument can be connected to the proximity probes for allowing a user to determine the relative vibration and position of a rotating shaft. In one embodiment, the instrument includes a signal conditioning amplifier located adjacent to the bearing housing. The signal conditioning amplifier transmits signals received from a corresponding proximity probe to a recording instrument.

The present invention also encompasses a method of sensing relative shaft vibration of a rotating shaft supported within a bearing assembly. The method includes the steps of providing a bearing housing adapted to rotatably support a shaft. The bearing housing includes a cylindrical shell supported therein. The shell defines a shaft bore for receiving a rotatable shaft therethrough. The method further includes placing at least one proximity probe in a corresponding probe receiving channel defined by the cylindrical shell. The proximity probe has a probe sensing end adapted to be placed adjacent to the shaft bore where sensing is desired. The proximity probe is secured within the corresponding probe receiving channel. Any suitable securing means may be used, including using an adhesive or threading the probe into the channel.

The method can further include the step of electrically connecting a signal conditioning amplifier to a corresponding proximity probe for transmitting signals received from the probe to a recording instrument for allowing a user to determine the relative vibration of a rotating shaft.

As discussed above, a pair of sensing probes can be used together in order to monitor the relative vibration and position of a rotating shaft. When two probes are used, the corresponding probe sensing ends of the probes are preferably positioned about 90° apart from each other along the perimeter of the shaft bore.

If additional probes are utilized, they can also be positioned around the circumference of the cylindrical shell to achieve the desired result as would be apparent to one skilled in the art.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art is set forth more particularly in the remainder of the specification, including reference to the accompanying figures, in which.

Figures 1, 2:
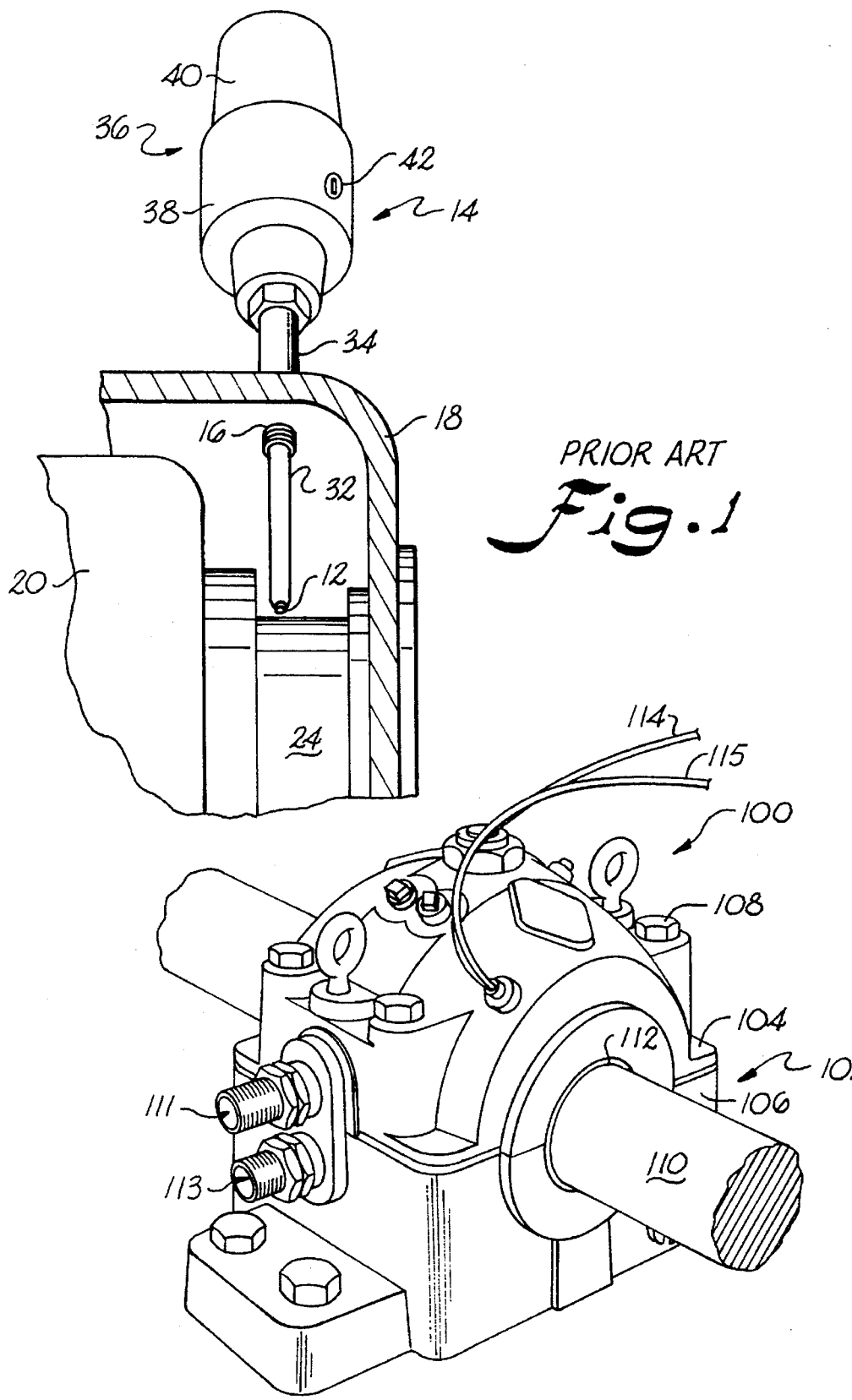
FIG. 1 is a perspective view with cutaway portions illustrating a prior art device.
FIG. 2 is a perspective view of a bearing assembly in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only and is not intended as limiting the broader aspects of the present invention, which broader aspects are embodied in the exemplary construction. In addition, it should be appreciated that while a journal bearing assembly is utilized herein for illustrative purposes, the present invention has applicability to all suitable types of bearing assemblies.

FIG. 1 illustrates a prior art journal bearing assembly generally 10 with one example of a conventionally installed proximity probe. The prior art device includes a proximity probe 12 extending from a proximity probe assembly generally illustrated at 14. In such prior probe arrangements, proximity probe assembly 14 is installed by drilling and threading a hole 16 in a bearing housing 18. Proximity probe assembly 14 is extended from bearing housing 18 to a rotatable shaft 24. Proximity probe 12 is placed close to shaft 24 between housing 18 and a cylindrical shell 20 in which shaft 24 is supported.

Proximity probe assembly 14 is comprised of multiple parts for protecting and installing proximity probe 12 and any wires connected thereto. Proximity probe assembly 14 includes a rigid metal sleeve 32 which extends from bearing housing 18 to shaft 24. Sleeve 32 may be connected to a standoff adapter 34 which is threaded into bearing housing 18 at threaded hole 16. A probe housing generally 36 is connected to standoff adapter 34 and includes a top portion 40 attached to a bottom portion 38. A wire connected to proximity probe 12 extends up through proximity probe assembly 14 and exits out a threaded conduit 42 for connection to an instrument or device for indicating relative shaft vibration.

Proximity probe 12 is to be positioned adjacent to shaft 24. During operation, proximity probe 12 should remain close to but never touch the rotating shaft. To adjust the position of proximity probe 12 in FIG. 1, standoff adapter 34 threaded into hole 16 is screwed towards or away from bearing housing 18 causing proximity probe 12 to move towards or away from shaft 24.

Figure 3:
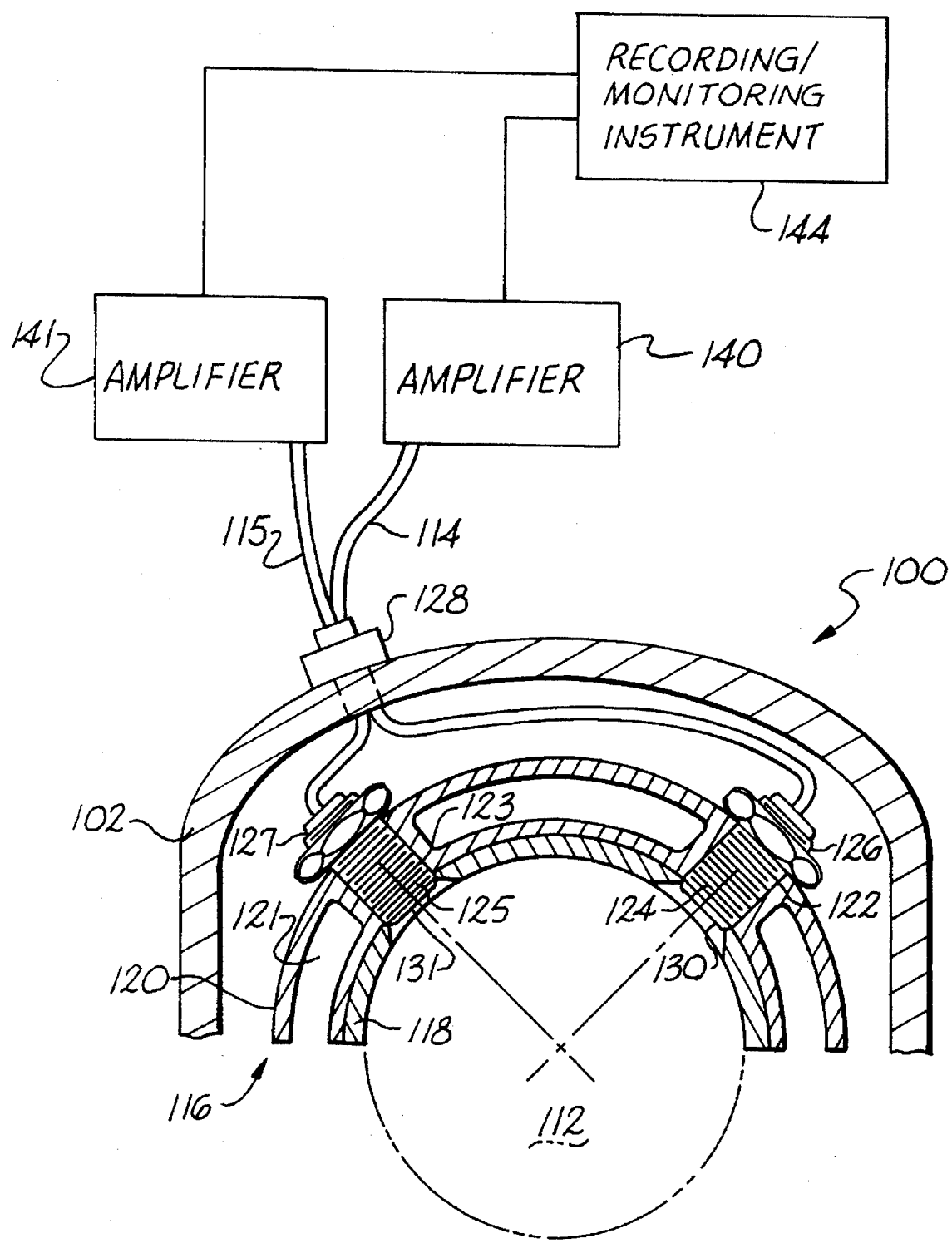
FIG. 3 is a partial cross sectional view of the bearing assembly illustrated in FIG. 2.

Referring to FIGS. 2 and 3, an improved bearing assembly in accordance with an embodiment of the present invention is illustrated at 100. Bearing assembly 100 includes a bearing housing generally 102 with an upper section 104 and a lower section 106. Upper section 104 and lower section 106 may be secured together by screws 108 or any other suitable securing means. It should be appreciated that the particular type bearing housing or assembly utilized may vary depending upon the application desired and is not critical to the present invention. Journal bearing assembly 100 is merely an exemplary embodiment. A similar bearing assembly to the one illustrated in FIG. 2 would be the SLEEVEOIL RTS pillow block design sold by Reliance Electric Industrial Company, the assignee of the present invention.

Journal bearing assembly 100 is designed to support a rotatable shaft 110 contained in a shaft bore 112. A lubricant is interposed between shaft 110 and a cylindrical shell contained within journal bearing assembly 100. As shown in FIG. 2, a pair of proximity probe cables 114 and 115 extend into bearing housing 102 and are connected to respective proximity probes for monitoring the relative shaft vibration and position of rotating shaft 110 contained within the cylindrical shell of journal bearing assembly 100.

In the particular embodiment illustrated in FIG. 2, bearing assembly 100 includes a pair of coolant fluid inlet ports 111 and 113. Not shown in FIG. 2, two corresponding outlet ports are located on the opposite side of bearing assembly 100. Ports 111 and 113 enter into coolant chambers contained within bearing assembly 100. As such, cooling fluids such as water, oil, or air can be used to cool the bearing by continuously flowing into inlet ports 111 and 113 and exiting through the outlet ports. Inside bearing assembly 100, the cooling fluid is circulated around the inside cylindrical shell for subsequently cooling a rotating shaft as is well known to one skilled in this art.

As one skilled in the art can appreciate, other bearing assemblies may not include similar external cooling means as described above. In fact, smaller journal bearing assemblies typically do not include inlet and outlet ports for circulating cooling fluids. However, such bearing assemblies are well within the scope of the present invention and can be adapted to include proximity probes as described hereinafter.

In accordance with the present invention and referring particularly to FIG. 3, a partial cross sectional view of journal bearing assembly 100 is shown illustrating a cylindrical shell generally 116 surrounding shaft bore 112 as partially illustrated in phantom. Cylindrical shell 116 is supported within bearing assembly 100 by being placed upon a bottom support structure built into lower section 106 of bearing housing 102.

Cylindrical shell 116 includes a babbitt layer 118 and a liner 120. Babbitt layer 118 provides an inside surface in shell 116 for lining shaft bore 112. Babbitt layer 118 is typically made from a soft metal alloy. The alloy can include various metals such as, for example, lead, tin, copper, or antimony. Preferably, the resulting alloy is soft for preventing scratches or other harm to a shaft rotating within shaft bore 112.

Cylindrical shell 116 also includes liner 120, which is adjacent and generally concentric to babbitt layer 118. In the embodiment illustrated, liner 120 includes a coolant chamber 121 for circulating a cooling fluid through bearing assembly 100. More specifically, cooling fluid enters inlet port 111 or 113 as illustrated in FIG. 2, flows into coolant chamber 121, and then exits out an outlet port located opposite the inlet ports. The cooling fluid cools the bearing during operation. Liner 120 is typically constructed from cast iron, but any suitable material could be utilized.

As explained above, the present invention also encompasses bearing assemblies that do not include fluid cooling means. As such, liner 120 may not include a coolant chamber and can be constructed from a variety of different materials depending upon the size and application of the journal bearing assembly.

In the embodiment shown in FIG. 3, cylindrical shell 116 defines a pair of probe receiving channels 122 and 123. Channels 122 and 123 extend completely through cylindrical shell 116 and generally flare out or widen where the channels intersect shaft bore 112. The widened portion prevents interference between the probes and babbitt layer 118. A pair of proximity probes 124 and 125 are contained within channels 122 and 123 respectively. As shown in FIG. 3, probes 124 and 125 can be threaded into channels 122 and 123. Further, a corresponding pair of locking nuts 126 and 127 lock probes 124 and 125 into place. Connected to proximity probes 124 and 125, cables 114 and 115 extend outside bearing housing 102 for attachment to instruments for determining the relative shaft vibration and position during operation.

A cable plug 128 holds cables 114 and 115 respectively into place where the cables extend from bearing housing 102. Cable plug 128 prevents proximity probes 124 and 125 from being damaged when any type of pulling force is applied to cables 114 and 115.

Unlike the prior art, cables 114 and 115 are not contained in a rigid metal sleeve assembly. As such, cables 114 and 115 remain flexible and permit cable plug 128 to be mounted at any desired location on bearing housing 102 without disturbing the location of proximity probes 124 and 125. Once a suitable location for mounting plug 128 has been determined, cables 114 and 115 can be threaded as shown through bearing assembly 100 in order to extend from the proximity probes to the outside of the housing.

As used here, a proximity probe refers to any type of transducer or vibration probe that can be utilized to detect shaft vibration or shaft position. In one preferred embodiment, the probes used in the present invention are non-contacting, eddy current proximity probes. In these types of probes, a radio frequency signal is radiated through the probe tip into a nearby object. Eddy currents are generated in the surface of the object, and the loss of strength of the return signal is detected. From this system, the position of the object is monitored continuously for showing relative shaft vibration. One example of a commercially available proximity probe suitable to the present invention is model #24701, distributed by Bentley Nevada, Inc. in Las Vegas, Nev.

Referring to FIG. 3, proximity probes 124 and 125 are shown extending into channels 122 and 123 respectively of cylindrical shell 116. Probes 124 and 125 have corresponding sensing ends 130 and 131 which have direct access to shaft bore 112. During operation, sensing ends 130 and 131 should remain close to, but not in contact with the adjacent rotating shaft. Probes 124 and 125 should be installed so that there is a slight gap between sensing ends 130 and 131 and a shaft positioned within shaft bore 112. In the present invention, this gap can be adjusted during assembly of journal bearing assembly 100. Once properly positioned, proximity probes 124 and 125 can be locked into place by locking nuts 126 and 127.

In a preferred embodiment, probe receiving channels 122 and 123 flare out or have a larger diameter at the point where channels 122 and 123 intersect shaft bore 112. As discussed above, the probe receiving channels are widened at this location so that babbitt layer 118 of cylindrical shell 116 does not cause interference during operation of the probes. Optionally, this flared out portion of the probe receiving channels can be filled with a non-conductive material, such as a plastic or epoxy, for making the inside surface of cylindrical shell 116 smooth.

In the particular embodiment illustrated, two proximity probes 124 and 125 are shown. When using two probes, the probes should ideally be spaced approximately 90° apart from each other along the circumference of the cylindrical shell as shown in FIG. 3. By using two probes in this arrangement, the probes not only monitor the relative vibration but also monitor the radial position of a rotating shaft. For instance, the comparison of a measurement obtained from probe 124 to a measurement obtained from probe 125 at a particular point in time provides the centerline position of a shaft. Comparison of similar measurements over time can be used for determining average shaft centerline position. This information can be used to determined whether the shaft is aligned, balanced, or damaged, whether there is a proper amount of lubricant in the journal bearing, or whether any other abnormalities are present in the bearing assembly.

Although the figures illustrate a dual proximity probe system, a greater or lesser number of proximity probes can used in the present invention. For example, the present invention also encompasses a single probe system for monitoring relative shaft vibration. Alternatively, more than two probes can be added to the journal bearing assembly for monitoring shaft vibration and position at other locations. Further, a proximity probe could be mounted adjacent the end of the rotating shaft. Such proximity probes can monitor axial vibration.

In another embodiment, probe receiving channels 122 and 123 are not threaded. In this embodiment, proximity probes 124 and 125 are secured in channels 122 and 123 with an adhesive. The adhesive may be any type of known adhesive material such as, for example, an epoxy. Of course, any other known type of securing material could be utilized for securing the embedded probes in the channels.

Proximity probes 124 and 125 are ultimately connected via cables 114 and 115 to an instrument or instruments for displaying signals received from probes 124 and 125. In a preferred embodiment, proximity probes 124 and 125 are connected to a signal conditioning amplifier illustrated at 140 and 141. Signal conditioning amplifiers 140 and 141 are preferably mounted and protected on the outside of bearing assembly 100. The signal conditioning amplifier sends a radio frequency signal to the proximity probe and then detects the loss of strength in the return signal as described above. This information is then transmitted to some type of recording or monitoring instrument as illustrated at 144 for display on a monitor or on a strip chart. A user can then refer to the monitor or strip chart for determining relative shaft vibration and/or shaft position.

The present invention eliminates the necessity of a number of components and processing steps from the prior art devices. Specifically, the cost of the probe housing assembly is eliminated. Further, adjustment of the proximity probes is done once, preferably during assembly of the journal bearing. The adjustment is made relative to the cylindrical shell adjacent the shaft bore instead of being done relative to the bearing housing. Therefore, as can be seen, the present invention is also embodied in an improved method of sensing shaft vibration and position in the journal bearing assembly which includes the steps of providing a journal bearing housing such as 100 adapted to rotatably support a shaft such as 110 in the housing. The method further includes the steps of providing at least one proximity probe adapted to be placed at the location where sensing is desired such as within probe receiving channel 122. The method further includes securing and adjusting proximity probe 124 within channel 122 so as to be responsive to a rotating shaft contained within bearing assembly 100. The method can include adding a second proximity probe 125 spaced 90° from proximity probe 124 along the circumference of cylindrical shell 116. Further, more than two probes can be added to the bearing assembly as described above. An instrument is connected to probes 124 and 125 for determining relative shaft vibration and position.

These and other modifications and variations to the present invention may be practiced by those of ordinary skill in the art without departing from the spirit and scope of the present invention which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the broader aspects of the invention so further described in such appended claims.

What is claimed is:

1. An improved bearing assembly, said bearing assembly comprising:

a) a bearing housing adapted to rotatably support a shaft;

b) a cylindrical shell contained within said bearing housing and defining a shaft bore for receiving a rotatable shaft therethrough, said cylindrical shell including a liner portion having a softer metal layer disposed on an interior thereof such that an inner surface of said softer metal layer defines said shaft bore, said cylindrical shell further defining at least one probe receiving channel extending therethrough; and c) at least one proximity probe for directly sensing proximity of the shaft and having a sensing end, said proximity probe located in said probe receiving channel such that said sensing end is situated radially external of said inner surface of said softer metal layer but is adjacent to said shaft bore where sensing is desired for sensing the relative vibration and position of a rotating shaft without contact therewith.

2. The bearing assembly as defined in claim 1, wherein said assembly includes multiple proximity probes embedded in said cylindrical shell for sensing the relative vibration and radial position of a rotating shaft.

3. The bearing assembly as defined in claim 2, wherein said proximity probes have corresponding probe sensing ends that are positioned 90° apart from each other along the perimeter of said shaft bore.

4. An improved bearing assembly as defined in claim 1, wherein said softer metal layer of said cylindrical shell is constructed of babbitt metal.

5. The bearing assembly as defined in claim 1, wherein said at least one proximity probe is secured in said probe receiving channel by an adhesive.

6. The bearing assembly as defined in claim 1, wherein said probe receiving channel is threaded for threadably securing said at least one proximity probe.

7. The bearing assembly as defined in claim 1, further including an instrument connected to said at least one proximity probe for determining the relative vibration and position of a rotating shaft.

8. The bearing assembly as defined in claim 7, wherein said instrument includes a signal conditioning amplifier located adjacent to said bearing housing for transmitting signals received from said at least one proximity probe to a recording instrument for allowing a user to determine the relative vibration and position of a rotating shaft.

9. The bearing assembly as defined in claim 7, further including a flexible cable within said bearing housing connecting said at least one proximity probe to said instrument.

10. An improved bearing assembly comprising:

a) a bearing housing adapted to rotatably support a shaft;

b) a cylindrical shell contained within said bearing housing and defining a shaft bore for receiving a rotatable shaft therethrough, said cylindrical shell including a liner portion having a softer metal layer disposed on an interior thereof such that an inner surface of said softer metal layer defines said shaft bore, said cylindrical shell further including a pair of probe receiving channels extending through said shell to said shaft bore, said probe receiving channels being angularly displaced from each other by approximately 90 degrees; and c) a pair of proximity probes for directly sensing proximity of the shaft and having corresponding probe sensing ends, said proximity probes being respectively secured in said probe receiving channels such that each respective sensing end thereof will be located radially external of said inner surface of said softer metal layer but will be adjacent to said shaft bore where sensing is desired for sensing the relative vibration and radial position of a rotating shaft without contact therewith.

11. The bearing assembly as defined in claim 10, wherein said proximity probes are secured in said respective probe receiving channels by an adhesive.

12. The bearing assembly as defined in claim 10, wherein said probe receiving channels are threaded for threadably securing said respective proximity probes therein.

13. The bearing assembly as defined in claim 10, wherein said proximity probes are each connected to a corresponding signal conditioning amplifier located adjacent to said bearing housing, wherein said signal conditioning amplifiers transmit signals received from said respective proximity probes to a recording instrument for allowing a user to determine the relative vibration and position of a rotating shaft.

14. The bearing assembly as defined in claim 10, wherein said probe receiving channels have respective widened portions where said channels intersect with said shaft bore.

15. The bearing assembly as defined in claim 14, wherein said widened portions are respectively filled with a non-conductive material, surrounding said sensing ends of said proximity probes, for providing a smooth surface lining said shaft bore.

16. The bearing assembly as defined in claim 10, wherein during operation a lubricant is interposed between a rotating shaft and said cylindrical shell for reducing friction within said bearing assembly.

17. A method of sensing relative shaft vibration of a rotating shaft supported within a bearing assembly, said method comprising the steps of:

a) providing a bearing housing adapted to rotatably support a shaft, said bearing housing including a cylindrical shell supported therein, wherein said shell defines a shaft bore for receiving a rotatable shaft therethrough, said cylindrical shell including a liner portion having a softer metal layer disposed on an interior thereof such that an inner surface of said softer metal layer defines said shaft bore, said cylindrical shell further defining at least one probe receiving channel extending therethrough;

b) placing at least one proximity probe having a probe sensing end in a corresponding probe receiving channel defined by said cylindrical shell such that said probe sensing end will be radially external of said inner surface of said softer metal layer but will be capable of directly detecting proximity and vibration of said rotatable shaft; and c) securing said at least one proximity probe within said corresponding probe receiving channel.

18. The method as defined in claim 17, wherein said at least one proximity probe is secured within said probe receiving channel by an adhesive.

19. The method as defined in claim 17, wherein said at least one proximity probe is threadably secured in said corresponding probe receiving channel.

20. The method as defined in claim 17, further comprising the step of electrically connecting a signal conditioning amplifier to said at least one proximity probe for transmitting signals received from said probe to a recording instrument for allowing a user to determine the relative vibration of a rotating shaft.

21. The method as defined in claim 17, wherein a pair of proximity probes are placed within corresponding probe receiving channels for monitoring the relative vibration and position of a rotating shaft.

22. The method as defined in claim 21, wherein said probe sensing ends of said respective proximity probes are positioned about 90° apart from each other along the perimeter of said shaft bore.

23. The method as defined in claim 17, wherein said softer metal layer of said cylindrical shell is constructed of babbitt metal.

24. An improved bearing assembly as defined in claim 1, wherein said probe receiving channel has a widened portion where said channel intersects with said shaft bore.

25. An improved bearing assembly as defined in claim 24, wherein said widened portion is filled with a non-conductive material, surrounding said sensing end of said proximity probe, for providing a smooth surface lining said shaft bore.

26. An improved bearing assembly as defined in claim 10, wherein said softer metal layer of said cylindrical shell is constructed of babbitt metal.

* * * * *